(12) United States Patent
Weller et al.

(10) Patent No.: US 11,110,907 B2
(45) Date of Patent: Sep. 7, 2021

(54) OPERATING VEHICLE DRIVE TRAIN WITH CLUTCH ASSEMBLY FOR TRANSMITTING TORQUE

(71) Applicant: GKN Automotive Ltd., Redditch (GB)

(72) Inventors: Markus Weller, Kettenhausen (DE); Erik Resvoll, Bruchhausen (DE); Fabian Oberbichler, Mühlwald (DE); Peter Raffin, Kiens (IT); Axel Schnitzler, Meckenheim (DE); Mark Zimmermann, Bornheim (DE)

(73) Assignee: GKN Automotive Ltd., Redditch (GB)

( * ) Notice: Subject to any disclaimer, the term of this patent is extended or adjusted under 35 U.S.C. 154(b) by 13 days.

(21) Appl. No.: 16/542,674

(22) Filed: Aug. 16, 2019

(65) Prior Publication Data

US 2020/0055512 A1 Feb. 20, 2020

(30) Foreign Application Priority Data

Aug. 20, 2018 (EP) ..................... 18189660

(51) Int. Cl.
| | |
|---|---|
| *B60W 10/02* | (2006.01) |
| *B60W 10/119* | (2012.01) |
| *B60W 30/186* | (2012.01) |
| *F16D 28/00* | (2006.01) |

(52) U.S. Cl.
CPC .......... *B60W 10/02* (2013.01); *B60W 10/119* (2013.01); *B60W 30/186* (2013.01); *F16D 28/00* (2013.01); *F16D 2500/30404* (2013.01)

(58) Field of Classification Search
CPC ............... B60W 10/02; B60W 10/119; B60W 30/1843; F16D 28/00
See application file for complete search history.

(56) References Cited

U.S. PATENT DOCUMENTS

| | | | |
|---|---|---|---|
| 9,732,719 B2 * | 8/2017 | Wright | ............... B60W 30/194 |
| 2009/0124456 A1 | 5/2009 | Zhang et al. | |
| 2017/0259804 A1 | 9/2017 | Lee et al. | |

FOREIGN PATENT DOCUMENTS

| | | |
|---|---|---|
| JP | H07269603 A | 10/1995 |
| JP | 2008167633 A | 7/2008 |
| JP | 2012-21629 A | 2/2012 |
| JP | 2014197655 A | 10/2014 |

OTHER PUBLICATIONS

JPO Notification of Reasons for Rejection for Application No. JP2019-149346 dated Jun. 16, 2020 (2 pages; English translation only).

* cited by examiner

*Primary Examiner* — Derek D Knight
(74) *Attorney, Agent, or Firm* — Bejin Bieneman PLC

(57) ABSTRACT

Operating a drive train of a vehicle having a clutch assembly, wherein the clutch assembly is actuatable via an actuating device for the switchable transmission of a torque, wherein a first state of the actuating device, and thus a second state of the clutch assembly, is settable via a position of a drive unit of the actuating device, comprises:
a) determining that a first torque request to the clutch assembly is constant; and
b) determining that a first position of the drive unit is constant within the interval; and then
c) controlling the drive unit with a dither function, wherein a position of the drive unit is continuously varied about the first position; and
d) ending the dither function when the conditions stated in steps a) and b) are no longer met.

20 Claims, 2 Drawing Sheets

OPERATING VEHICLE DRIVE TRAIN WITH CLUTCH ASSEMBLY FOR TRANSMITTING TORQUE

CROSS-REFERENCE TO RELATED APPLICATIONS

This application claims priority to European Application No. EP 18189660.6 filed on Aug. 20, 2018, which applications are hereby incorporated herein by reference in their entireties.

BACKGROUND

A vehicle clutch assembly can be controlled by an electronic control unit (ECU). Such an electronic control unit may be integrated into the clutch assembly itself or into a higher-order electronic management system of the vehicle, in particular the drive train.

To be able to ensure the most optimal driving dynamics of a need-based all-wheel drive vehicle, also in borderline situations (for example, frequent load variation, repeated starting on a hill, repeated switching between single-axle operation and all-wheel operation, etc.), high demands are placed on the electronic control unit of the clutch assembly. In particular in the borderline situations described above, the high level of stress may result in intense heating, even overheating, of the electronic control unit, the power stage, and/or the electronic servomotor. In these cases, known electronic control units, power stages, and/or electronic servomotors are switched off, in particular when overheating is imminent, to avoid permanent damage to the particular component, in particular the control unit and/or the electronic servomotor.

However, such protective measures against overheating have the disadvantage that they directly affect the operation or the driving performance of the vehicle, and may sometimes result in failure of the need-based all-wheel system. This may result in losses in driving comfort and/or driving dynamics that are noticeable to the driver.

SUMMARY

A method for operating a drive train of a vehicle is disclosed that provides a protective measure against overheating which has practically no perceivable effect on the driving performance of the vehicle. The aim of the method in particular is to avoid undesirable overheating of the electronic control unit (ECU) and/or the electronic servomotor, also in borderline situations, without the driver noticing a (distinct) drop in performance.

A method is provided according to the features of claim 1. Further advantageous embodiments of the method are set forth in the dependent claims. It is noted that the features specified individually in the claims may be combined with one another in any technologically meaningful manner, and define further embodiments. Furthermore, the features specified in the claims are rendered more precisely and explained in more detail in the description, with further embodiments being presented.

The present disclosure relates to operating a drive train of a vehicle having a clutch assembly, in particular for transmitting and/or distributing torque. The disclosure further relates to a method vehicle dynamics control, for need-based all-wheel systems, and/or active axle locking, and vehicles that are configured to be adapted in this regard, in which information concerning the instantaneous engine torque, the longitudinal acceleration, the transverse acceleration, the yaw rates (which refers to the speed of rotation of a vehicle about the vertical axis), the steering angle, and/or the wheel speeds is present. The further relates to all-wheel drive vehicles in which either the rear axle or the front axle may be connected (in part and/or at times) by means of an electronically regulated clutch assembly. Alternatively or additionally, the present disclosure applies to axle locking, in particular active axle locking, in which one side of an axle is at least partially decoupleable from an opposite side of the axle (in the axial direction) by means of an electronically regulated clutch assembly. A need-based torque distribution between two wheels of an axle may be carried out in this way. The clutch assembly can be an electromechanical clutch system, in particular an electronically controlled multiplate clutch. An electromechanical clutch system is to be understood here to mean a clutch system or clutch assembly in which an electronic servomotor (an electric machine) for adjusting the coupling force is provided. In such an electronic servomotor, mechanical coupling generally results between the motor rotation angle (rotational motion) and the clutch displacement travel (translational motion).

A method for operating a drive train of a vehicle having a clutch assembly is disclosed. The clutch assembly is actuatable via an actuating device for the switchable transmission of a torque. A first state of the actuating device, and thus a second state of the clutch assembly, is settable via a position of a drive unit of the actuating device. The method comprises at least the following steps:

a) determining that a first torque request to the clutch assembly is constant at least within an interval of at most 100 milliseconds (ms) or has a maximum torque deviation of at most 100 newton meters (Nm), preferably at most 20 Nm, particularly preferably at most 10 Nm, within the interval; and b) determining that a first position of the drive unit is constant within the interval or has a maximum position deviation (for example, at most 2 ticks or 1 tick) that corresponds to the maximum torque deviation (a change in the position corresponds to a change in the torque request or a change in the torque transmitted by the clutch assembly); and (then)

c) controlling the drive unit with a dither function, wherein a position of the drive unit is continuously varied about the first position; and d) ending the dither function when the conditions stated in steps a) and b) are no longer met.

The sequence of the method steps indicated above results during routine operation of the drive train of the vehicle. Method steps a) through d) may be carried out in continuous repetition during operation of the drive train. Method steps a) through d) may also be carried out or repeated, at least in part, in parallel.

The method disclosed herein is based in particular on the concept of influencing control of the clutch assembly in such a way that the drive unit is moved (instead of being stopped) in order to fulfill a predetermined torque request or to transmit a predetermined torque via the clutch assembly. In fact, in particular a change in the transmitted torque then also takes place.

In particular, the drive unit includes an electric machine that is operable with a multiphase current, wherein with an essentially constant torque request the electric machine is (essentially) stopped, and (optionally) only one phase of the multiple phases of the multiphase system is loaded with a phase current. By use of the method a movement of the electric machine may be ensured, so that multiple phases are loaded with phase currents.

In particular, it is thus possible to reduce a load on the (at least) one phase (which is acted on by the phase current with a constant position of the electric machine) or the few phases, since due to the movement of the electric machine, multiple phases (i.e., more than the at least one phase or more than the few phases) are acted on for rotating the electric machine. Overheating of the drive unit may thus be at least delayed or even completely prevented.

By means of a dither function, the electric machine in particular is controlled in such a way that the electric machine may follow an oscillation of the dither function via a movement of the electric machine. In particular, the aim is for the electric machine to undergo a movement specifically so that instead of the one phase, multiple phases of the multiphase system are acted on by the current.

The dither function is the controller of the electric machine, so that the electric machine undergoes a movement about the first position or oscillates about the first position. With the dither function, the aim on the one hand is for the electric machine to be moved, and on the other hand, for a preferably constant torque to be transmitted corresponding to the first torque request that is actually present according to step a).

The clutch assembly can be an electromechanical clutch system, in particular an electronically controlled multiplate clutch. An electromechanical clutch system is understood here in particular to mean a clutch system or clutch assembly in which an electronic servomotor (an electric machine as the actuating device) for adjusting the coupling force is provided. In such an electronic servomotor, the mechanical coupling generally results between the motor rotation angle (rotational motion) and the clutch displacement travel (translational motion).

In particular, via the clutch assembly a torque request by a control unit is implemented by the method, for example the plates of a multiplate clutch. For this purpose, the actuating device is placed in a first state, and a second state of the clutch assembly is thus set (a position of the plates for transmitting a torque corresponding to the torque request). The drive unit of the actuating device has a certain position in the first state of the actuating device.

According to step a), it is determined (for example, checked by a control unit) that a first torque request to the clutch assembly is constant at least within an interval of at most 100 milliseconds (ms) or has a maximum torque deviation of 100 newton meters (Nm), preferably 20 Nm, particularly preferably at most 10 Nm, within the interval.

According to step b), it is determined that a first position of the drive unit is constant within the interval, or has a maximum position deviation that corresponds to the maximum torque deviation (a change in the position corresponds to a change in the torque request or a change in the torque transmitted by the clutch assembly).

Steps a) and b) may optionally also be carried out together. In particular, the determination according to step a) or b) results in the respective other condition according to step b) or a).

In particular, the drive unit includes an electric machine, wherein a rotational motion of the electric machine is converted into a translational motion for actuating the clutch assembly. The position is an angular position of the rotational motion which is controllable by a control unit.

In particular, the rotational motion of the drive unit may be controlled within the range of "ticks." In particular, a tick corresponds to an (in each case equal) angular magnitude of 5 to 30 angular degrees, in particular 5 to 10 angular degrees. A rotational motion of 360 angular degrees may preferably be divided into 42 ticks or 64 ticks.

The position can be determinable based on angular magnitudes. In particular, the smallest angular magnitude settable by the control unit is 1 tick.

In particular, in the (first) position determined in step a) or b), a rotational motion about an angular magnitude of 10 angular degrees corresponds to a change in a transmitted torque of at least 0.1 Nm and/or at most 25 Nm, preferably at least 1 Nm and/or at most 15 Nm.

In particular, it is thus checked whether the drive unit is moved only to a limited extent (i.e., undergoes a rotational motion) or is even stopped. In this case, overheating is possible and expected, since in particular, for example only one phase of the multiphase system is loaded with or acted on by the electric current necessary for controlling the first position.

Thus, if it is determined that the drive unit is not sufficiently moved and that overheating is present or may occur, according to step c) a dither function is initiated, via which a position of the drive unit is in particular continuously varied about the first position.

The position is varied in particular by a small amount, so that on the one hand the electric drive unit is rotated (and multiple phases of the multiphase system are acted on by electric current), and on the other hand, the transmitted torque is changed only to the extent that there is little or no impairment of driving comfort.

According to step d), the dither function is ended in particular when a movement of the drive unit is once again present to a sufficient extent (for example, due to a small or varying torque request).

In particular, the method is initiated with steps a) through d) only when the first torque request to the clutch assembly is greater than a first limit value.

In particular, the first torque request is at least 500 Nm, preferably at least 800 Nm, particularly preferably at least 1000 Nm.

In particular, the method is carried out when (impermissible) overheating of a component of the drive unit (the power electronics system, for example) is to be expected. Overheating is more likely to be expected when large torques are transmitted, since this requires high electric currents via which the clutch assembly is placed in the desired state.

In particular, the method is initiated with steps a) through d) only when an overheating warning for the drive unit is present. In particular, for example a temperature measurement or a computerized and/or model-based temperature determination may be carried out. The overheating warning may be set as a signal of a control unit, so that the method is carried out only after the signal is set.

The drive unit may include an electric machine, wherein a rotational motion of the electric machine is converted into a translational motion for actuating the clutch assembly. The position is an angular position of the rotational motion which is controllable by a control unit. The position is controllable by the control unit in angular magnitudes of at least 5 angular degrees and at most 30 angular degrees ("ticks").

In particular, according to step c) the position varies at least between a second position and a third position, wherein the second position and the third position, in different rotational directions of the drive unit, are each spaced apart from the first position by at least 15 angular degrees, preferably at least 20 angular degrees, particularly preferably at least 25 angular degrees; and/or at most 100 angular degrees, preferably at most 75 angular degrees, particularly preferably at most 45 angular degrees.

In particular, the second position and the third position are spaced apart from the first position by essentially the same distance.

In particular, in the first position determined in step b), a rotational motion about an angular magnitude of 10 angular degrees corresponds to a change in a transmitted torque of at least 0.1 Nm and/or at most 25 Nm, preferably at least 1 Nm and/or at most 15 Nm.

In particular, according to step c) the position varies at least between a second position and a third position, wherein the second position corresponds to a second torque request and the third position corresponds to a third torque request, wherein the second torque request and the third torque request differ from one another by at most 150 Nm, in particular by at most 100 Nm, preferably by at most 50 Nm. In particular, a first torque request for the first position differs from the second and the third torque requests by the same respective amount.

In particular, according to step c) the position varies at least between a second position and a third position, wherein a frequency of the dither function is between 0.2 and 4 hertz, in particular between 0.5 and 2 hertz.

In particular, the dither function has a sine-wave signal, so that the drive unit oscillates sinusoidally about the first position (with an amplitude that is the difference between the second position and the third position). Of course, other signal shapes are possible.

During step c), the second position and the third position may be selected to be variable or different (for example, as a function of the torque request that is present, etc.).

In particular, the drive unit includes an electric machine that is operable with a multiphase current, wherein with an essentially constant torque request the electric machine is stopped, and only one phase of the multiple phases of the multiphase system is loaded with a phase current. By use of the method a movement of the electric machine may be ensured, so that multiple phases are loaded with phase currents.

With the dither function, the electric machine may be controlled in such a way that the electric machine may follow an oscillation of the dither function via a movement of the electric machine. The dither function thus in particular has a frequency and an amplitude, so that the electric machine may follow at least the frequency (with a mechanical movement).

Furthermore, a vehicle having a clutch assembly is disclosed, wherein an electronic control unit that is suited and configured for carrying out the described method is associated with the clutch assembly. In particular, the control unit carries out the method during operation of the vehicle.

In particular, the clutch assembly is used for transmitting torques, for example by a drive machine (an internal combustion engine or electric drive, for example) of the motor vehicle, to a drive train. In particular, the clutch assembly is used for the variable distribution of torque to different axles of the vehicle. The electronic control unit may include a program-controlled microprocessor and an electronic memory in which an appropriate control program is stored.

The clutch assembly generally has a multiplate clutch and at least one (externally controllable) actuating unit for activating and deactivating the torque transmission. The actuating unit may include an electric machine, for example an electronic actuator, in particular an electronic servomotor. The multiplate clutch generally includes at least one compressible plate assembly that is compressible by means of the actuating unit in order to initiate a torque transmission. The actuating unit is generally controlled by the electronic control unit, which appropriately delivers electric control currents to the actuating unit via corresponding actuation lines.

A system for data processing is also disclosed, including a processor that is adapted and/or configured in such a way that it carries out the method or its steps (individually, partially, or completely) described or claimed herein. In addition, a computer program may be provided that includes commands which, during execution of the program by a computer, prompt the computer to carry out the steps of the method (individually, partially, or completely).

The details, features, and advantageous embodiments discussed above in conjunction with the method may correspondingly arise also for the vehicle presented herein, and vice versa. In this regard, reference is made in full to that discussion for a more detailed characterization of the features.

For avoidance of doubt, it is noted that the ordinal numbers used herein ("first," "second," "third," . . . ) are used only to distinguish between multiple similar objects, variables, or processes; i.e., no dependency and/or sequence of these objects, variables, or processes relative to one another are/is necessarily specified. If a dependency and/or sequence is necessary, this is explicitly indicated herein, or is readily apparent to those skilled in the art with resepct to the embodiment specifically described.

SUMMARY OF THE DRAWINGS

Explanation is provided in greater detail below with reference to the figures. It is pointed out that the invention is not to be construed as being limited by the illustrated exemplary embodiments. In particular, unless explicitly stated otherwise, it is also possible to extract partial aspects of the information shown in the figures and combine them with other components and findings from the present description. The figures schematically show the following.

DESCRIPTION

Figure 1:
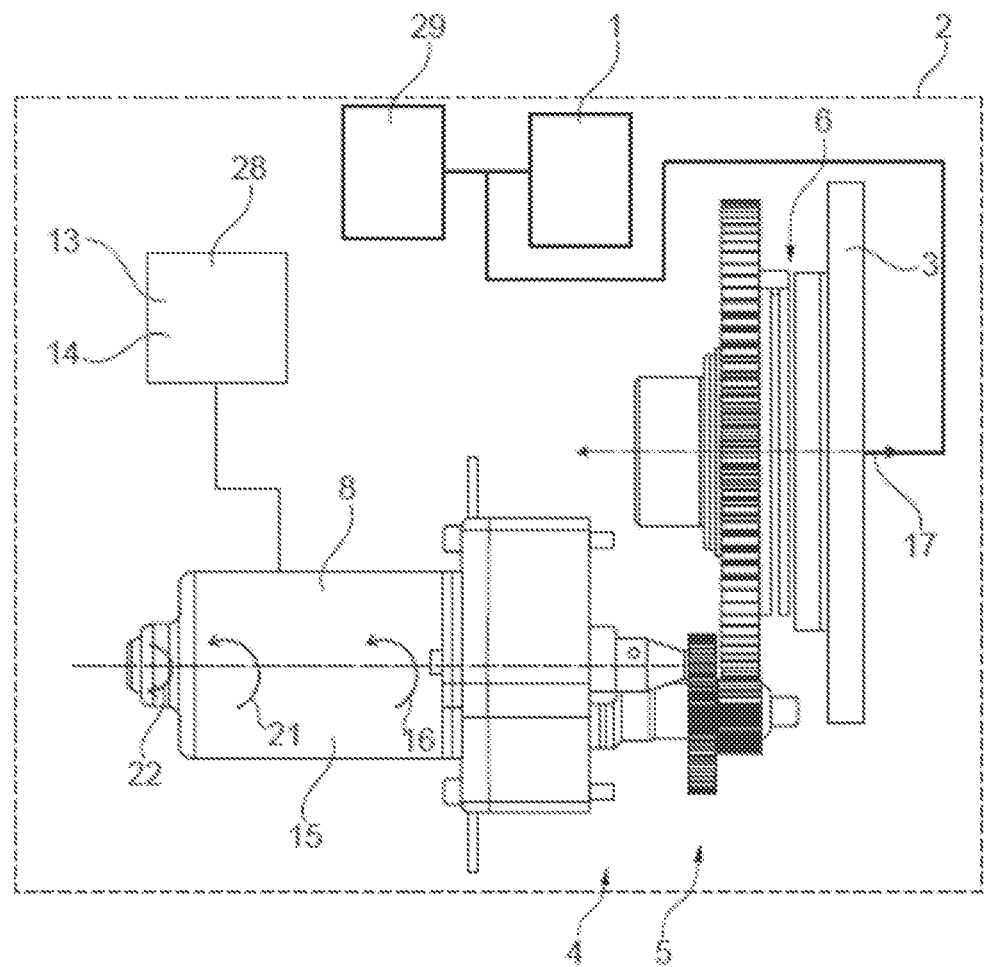
FIG. 1: shows a vehicle having a clutch assembly for transmitting a torque from a drive unit to a drive train.

FIG. 1 shows a vehicle 2 having a clutch assembly 3 for transmitting a torque from a drive machine 29 to a drive train 1. An electronic control unit 28 that is suited and configured for carrying out the above-described method, or that carries out the method, is associated with the clutch assembly 3. The clutch assembly 3 is actuatable via an actuating device 4 for the switchable transmission of a torque. A first state 5 of the actuating device 4, and thus a second state 6 of the clutch assembly 3, is settable via a position 7 of a drive unit 8 of the actuating device 3. The drive unit 8 here is an electric machine 15, wherein a rotational motion 16 of the electric machine 15 is converted into a translational motion 17 for actuating the clutch assembly 3. The position 7 is an angular position of the rotational motion 16 which is controllable by a control unit 28.

The actuating device 3 is controlled by an electronic control unit 28, which appropriately delivers electric control currents to the actuating device 3 via corresponding actuation lines.

Figure 2:
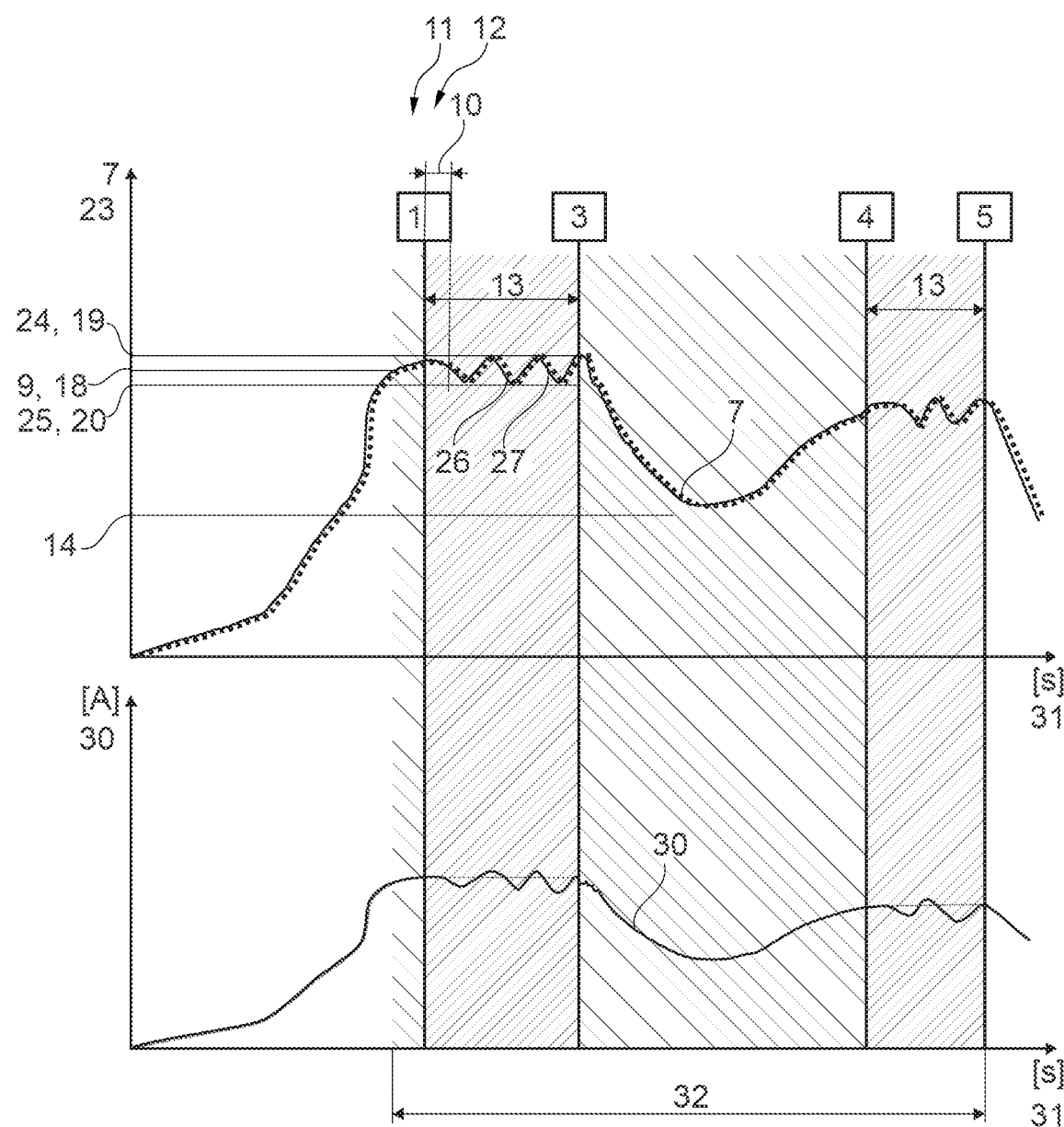
FIG. 2: shows two diagrams illustrating the method.

FIG. 2 shows two diagrams for illustrating the method. In the top diagram, the (actual) position 7 (angular magnitude) of the drive unit 8 (i.e., its position 7 that is necessary for transmitting the torque request 23 that is present in each case) and the torque request 23 (Nm) are plotted on the vertical axis. Time 31 (seconds) is plotted on the horizontal axis. The illustrated curve shows the progression of the position 7 with respect to the setpoint position 24.

In the bottom diagram, an effective value of the electric current 30 (amperes) is plotted on the vertical axis. Time 31 is plotted on the horizontal axis. The illustrated curve shows the progression of the current 30. The dashed-line portion of the curve shows the current 30 that is present without carrying out the method.

According to step a), it is determined (for example, checked by a control unit 28) that a first torque request 9 to the clutch assembly 3 is constant within an interval 10 or has a maximum torque deviation 11 within the interval 10.

According to step b), it is determined that a first position 18 of the drive unit 8 is constant within the interval 10 or has a maximum position deviation 12 that corresponds to the maximum torque deviation 11 (a change in the position 7 corresponds to a change in the torque request 23 or a change in the torque transmitted by the clutch assembly 3).

If it is determined that the drive unit 8 is not sufficiently moved and that overheating is present or may occur, according to step c) a dither function 13 is initiated, via which a position 7 of the drive unit 8 is continuously varied about the first position 18.

The position 7 is varied by a small amount, so that on the one hand the electric drive unit 8 is rotated (and multiple phases of the multiphase system are acted on by electric current 30), and on the other hand, the transmitted torque is changed only to the extent that there is little or no impairment of driving comfort.

According to step d), the dither function 13 is ended when a movement of the drive unit 8 is once again present to a sufficient extent (for example, due to a small or varying torque request 23)

The method is initiated with steps a) through d) only when the first torque request 9 to the clutch assembly 3 is greater than a first limit value 14.

In addition, the method is carried out when (impermissible) overheating of a component of the drive unit 8 (the power electronics system, for example) is to be expected. Overheating is more likely to be expected when large torques are transmitted, since this requires high electric currents 30 via which the clutch assembly 3 is placed in the desired state.

The method is initiated with steps a) through d) only when an overheating warning for the drive unit 8 is present. The overheating warning is set as a signal 32 of a control unit 28, so that the method is carried out only after the signal 32 is set.

According to step c), the position 7 varies at least between a second position 19 and a third position 20, wherein the second position 19 and the third position 20, in different rotational directions 21, 22 of the drive unit 8, are each spaced apart from the first position 18, by certain angle magnitudes.

According to step c), the position 7 varies between a second position 19 and a third position 20, wherein the second position 19 corresponds to a second torque request 24 and the third position 20 corresponds to a third torque request 25. Furthermore, according to step c) the position 7 varies between a second position 19 and a third position 20, wherein a frequency 26 of the oscillation 27 of the dither function 13 is selected in such a way that the drive unit 8 follows the oscillation 27.

LIST OF REFERENCE NUMERALS 1 drive train
2 vehicle
3 clutch assembly
4 actuating device
5 first state
6 second state
7 (actual) position
8 drive unit
9 first torque request
10 interval
11 maximum torque deviation
12 maximum position deviation
13 dither function
14 first limit value
15 machine
16 rotational motion
17 translational motion
18 first position
19 second position
20 third position
21 first rotational direction
22 second rotational direction
23 torque request
24 second torque request
25 third torque request
26 frequency
27 oscillation
28 control unit
29 drive machine
30 current
31 time
32 signal

The invention claimed is:

1. A method for operating a drive train of a vehicle having a clutch assembly, wherein the clutch assembly is actuatable via an actuating device for switchable transmission of a torque; wherein the actuating device is settable via a position of a drive unit of the actuating device; wherein the method comprises:
   a) determining that a first torque request to the clutch assembly is constant within at least one interval of at most 100 milliseconds or has a maximum torque deviation of at most 100 newton meters within the at least one interval;
   b) determining that a first position of the drive unit is constant within the at least one interval or has a maximum position deviation that corresponds to the maximum torque deviation;
   c) controlling the drive unit with a dither function, wherein the position of the drive unit is continuously varied about the first position; and
   d) ending the dither function when the conditions stated in steps a) and b) are no longer met.

2. The method of claim 1, wherein the method is initiated with steps a) through d) only when at least one of the first torque request to the clutch assembly is greater than a first limit value or an overheating warning for the drive unit is present.

3. The method of claim 1, wherein the first torque request is at least 800 newton meters.

4. The method of claim 1, wherein the drive unit includes an electric machine, wherein a rotational motion of the electric machine is converted into a translational motion for actuating the clutch assembly, wherein the position is an angular position of the rotational motion which is controllable by a control unit wherein the position is controllable in angular magnitudes of at least 5 angular degrees and at most 30 angular degrees, by the control unit.

5. The method of claim 4, wherein according to step c), the position varies at least between a second position and a third position, wherein the second position and the third position, in different rotational directions of the drive unit, are each spaced apart from the first position by at least 15 angular degrees or at most 100 angular degrees.

6. The method claim 4, wherein, in the first position determined in step b), a rotational motion about an angular magnitude of 10 angular degrees corresponds to a change in a torque request of at least 25 newton meters.

7. The method of claim 1, wherein according to step c), the position varies at least between a second position and a third position, wherein the second position corresponds to a second torque request and the third position corresponds to a third torque request, wherein the second torque request and the third torque request differ from one another by at most 150 newton meters.

8. The method of claim 1, wherein according to step c), the position varies at least between a second position and a third position, wherein a frequency of the dither function is between 0.2 and 4 hertz.

9. The method of claim 1, wherein the drive unit includes an electric machine that is operable with a multiphase current, wherein with an essentially constant torque request the electric machine is stopped and only one phase of the multiple phases is loaded with a phase current, wherein by use of the method a movement of the electric machine is ensured, so that multiple phases are loaded with phase currents, wherein the essentially constant torque request is responded to via a varying torque.

10. The method of claim 9, wherein by means of the dither function, the electric machine is controlled in such a way that the electric machine may follow an oscillation of the dither function via a movement of the electric machine.

11. An electronic control unit for a drive train of a vehicle having a clutch assembly, wherein the clutch assembly is actuatable via an actuating device for switchable transmission of a torque; wherein the actuating device is settable via a position of a drive unit of the actuating device; the control unit configured to:
  a) determine that a first torque request to the clutch assembly is constant within at least one interval of at most 100 milliseconds or has a maximum torque deviation of at most 100 newton meters within the at least one interval;
  b) determine that a first position of the drive unit is constant within the at least one interval or has a maximum position deviation that corresponds to the maximum torque deviation;
  c) control the drive unit with a dither function, wherein the position of the drive unit is continuously varied about the first position; and
  d) end the dither function when the conditions stated in steps a) and b) are no longer met.

12. The control unit of claim 11, further configured to initiate steps a) through d) only when at least one of the first torque request to the clutch assembly is greater than a first limit value or an overheating warning for the drive unit is present.

13. The control unit of claim 11, wherein the first torque request is at least 800 newton meters.

14. The control unit of claim 11, wherein the drive unit includes an electric machine, wherein a rotational motion of the electric machine is converted into a translational motion for actuating the clutch assembly, wherein the position is an angular position of the rotational motion which is controllable by a control unit wherein the position is controllable in angular magnitudes of at least 5 angular degrees and at most 30 angular degrees, by the control unit.

15. The control unit of claim 14, wherein according to step c), the position varies at least between a second position and a third position, wherein the second position and the third position, in different rotational directions of the drive unit, are each spaced apart from the first position by at least 15 angular degrees or at most 100 angular degrees.

16. The control unit of claim 14, wherein, in the first position determined in step b), a rotational motion about an angular magnitude of 10 angular degrees corresponds to a change in a torque request of at least 25 newton meters.

17. The control unit of claim 11, wherein according to step c), the position varies at least between a second position and a third position, wherein the second position corresponds to a second torque request and the third position corresponds to a third torque request, wherein the second torque request and the third torque request differ from one another by at most 150 newton meters.

18. The control unit of claim 11, wherein according to step c), the position varies at least between a second position and a third position, wherein a frequency of the dither function is between 0.2 and 4 hertz.

19. The control unit of claim 11, wherein the drive unit includes an electric machine that is operable with a multiphase current, wherein with an essentially constant torque request the electric machine is stopped and only one phase of the multiple phases is loaded with a phase current, wherein by use of the method a movement of the electric machine is ensured, so that multiple phases are loaded with phase currents, wherein the essentially constant torque request is responded to via a varying torque.

20. The control unit of claim 11, wherein by means of the dither function, the electric machine is controlled in such a way that the electric machine may follow an oscillation of the dither function via a movement of the electric machine.

\* \* \* \* \*

UNITED STATES PATENT AND TRADEMARK OFFICE
CERTIFICATE OF CORRECTION

PATENT NO. : 11,110,907 B2  
APPLICATION NO. : 16/542674  
DATED : September 7, 2021  
INVENTOR(S) : Weller et al.

Page 1 of 1

It is certified that error appears in the above-identified patent and that said Letters Patent is hereby corrected as shown below:

In the Claims

Column 9, in Line 15, replace "The method claim" with -- The method of claim --.

Signed and Sealed this  
Eighth Day of February, 2022

Drew Hirshfeld  
*Performing the Functions and Duties of the*  
*Under Secretary of Commerce for Intellectual Property and*  
*Director of the United States Patent and Trademark Office*